United States Patent [19]

Wright

[11] 4,378,401

[45] Mar. 29, 1983

[54] MANUFACTURE OF STRUCTURAL BOARD PANELS

[75] Inventor: Charles L. Wright, Pagham, England

[73] Assignee: Borfglace Limited, London, England

[21] Appl. No.: 224,544

[22] PCT Filed: Mar. 31, 1980

[86] PCT No.: PCT/GB80/00059

§ 371 Date: Nov. 30, 1980

§ 102(e) Date: Nov. 25, 1980

[87] PCT Pub. No.: WO80/02125

PCT Pub. Date: Oct. 16, 1980

[30] Foreign Application Priority Data

Mar. 30, 1979 [GB] United Kingdom ............... 7911091

[51] Int. Cl.³ .................. D03D 3/00; B05D 1/36; E04C 1/00
[52] U.S. Cl. .................. 428/227; 52/309.14; 52/309.16; 52/309.17; 52/515; 52/596; 156/62.2; 156/77; 264/122; 264/128; 427/180; 427/203; 427/403; 428/283; 428/288; 428/289; 428/292; 428/334
[58] Field of Search .............. 156/62.2, 77; 264/228, 264/109, 112, 333, 46.4, 122, 128; 106/86, 90; 428/227, 283, 288, 292, 289, 334; 52/309.17, 309.14, 309.16; 427/180, 203, 403

[56] References Cited

U.S. PATENT DOCUMENTS

| | | | |
|---|---|---|---|
| 3,384,522 | 5/1968 | Rubenstein | 264/228 X |
| 3,843,431 | 10/1974 | Dostalik | 156/62.2 |
| 3,878,278 | 4/1975 | Miller et al. | 264/228 X |
| 4,113,913 | 9/1978 | Smiley | 106/86 X |
| 4,129,637 | 12/1978 | Kennedy | 264/112 |

*Primary Examiner*—Michael R. Lusignan
*Assistant Examiner*—Thurman K. Page
*Attorney, Agent, or Firm*—Kemon & Estabrook

[57] ABSTRACT

A method of forming structural board panels from short strands of bagasse or other cellulistic material. The material resinated, compressed and cured to give an open structural block. A mortar screed of portland cement and sand is then applied to penetrate interstices between the strands and is built up with rendering and facing layers of mortar. A reinforcement, such as an open mesh net of resinated nylon strands may be incorporated in the facing layer.

18 Claims, No Drawings

MANUFACTURE OF STRUCTURAL BOARD PANELS

This invention relates to structural board panels formed from cellulistic materials for construction of buildings together with methods of forming the panels.

According to the present invention there is provided a method of forming a structural board panel including depositing a loose mat of overlapping strands of cellulistic material to which a resin adhesive has been applied, compressing and curing the mat to give an open structured block, applying a portland cement mix to penetrate into interstices between the strands and to provide a rendering layer on the block.

Preferably, a further layer of cement mix is applied as a facing layer to the rendering layer.

Desirably, a reinforcement of resinated filamentary material introduced into the cement mix layers.

Suitably, the filamentary material is in the form of nylon strands.

Advantageously, resin is applied to the filamentary material and cured partially to an extent sufficient to achieve an adhesive bond and then introduced between the deposition of the facing layer and the rendering layer such that exothermic reactions in the resin and in the cement mix mutually assist.

The invention also includes structural board panels formed by the foregoing methods.

In one embodiment of the invention, the panels are formed by depositing a loose mat of overlapping short strands of bagasse which have been shredded in a conventional manner and to which a resin adhesive has been applied, compressing and curing the mat to give an open structured block having a density of between 160 and 400 kg/m$^3$, preferably 240 kg/m$^3$ and surface aperture of between 25 and 75%. A screed of mortar of portland cement and sand, approximately in the ratio 1:3, is then applied to one face of the block to penetrate interstices between the strands to a depth of several strands, i.e. between 5 and 25 mm, preferably 15 mm. Next there is provided a rendering of mortar on the face of a thickness of between 3 and 15 mm, preferably less than 5 mm, on to which is laid, as a reinforcement, a loose net of three strand nylon filaments at approximately 15 mm. rectangular pitching. Finally, a facing of mortar is applied to a thickness of between 3 and 15 mm, preferably less than 6 mm.

Conveniently the thickness of the rendering and the facing is controlled by forming the mat oversize in length and breadth and consecutively clamping first and second steel strip formers or templates of the appropriate thickness respectively in register with the edge portions of the mat and the second former in register with the first after positioning the loose net of nylon on the surface of the rendering layer of mortar. Following setting of the rendering and facing the formers are removed and the panels cut down to size.

Upon test upon a 100 mm thick sample, satisfactory results were obtained for fire resistance, a 'U' value of between 0.64 and 0.66 was obtained and the sample was dimensionally stable against theremal or moisture movement.

Prior to placement on the rendering layer of mortar, the loose net of nylon filaments is coated with resin and then part cured to an advanced stage of polymerisation, to avoid water migration and effects arising from the composition of the cement when deposited on the rendering and impregnated with the cement, sand and water mix of the facing layer. A water soluble, phenol free resorcinol formaldehyde novalac resin cross-linked with formaldehyde or paraform is used and, since the setting reaction of both the cement and the resin are exothermic, with the resin having a faster reaction time, the two reactions are arranged to mutually assist each other to obtain a satisfactory bonding and a faster stabilisation time compared with the corresponding individual stabilisation times. The water content of the cement and resin mixtures is determined by the need to avoid over dilution of the resin, which would weaken adhesion between the resin and the filaments, and restricting the rates of exothermal heat release in order to achieve high strength properties. A fungicide may be added without interfering with the reactions and strength properties.

Panels utilising a facing of the foregoing form can be expected to have an ultimate bending strength increased by a factor of up to 8.5 compared with an unclad panel for panels measuring 100 mm. thick, 600 mm. wide and 2400 long and clad as hereinbefore described and withstand an external filament stress of 18 N/m$^2$. It will be appreciated that by cladding both faces of the panel a further increase in the ultimate bending stress can be obtained.

It will also be appreciated that strands of cellulistic material other than bagasse, such as wood, may be utilised to form the blocks. Furthermore, other materials, such as polypropylene, sisal, carbon fibre or glass fibre, may be utilised for reinforcement and the reinforcement may be incorporated directly into the facing layer. Alternatively, the rendering and facing layers may be combined and the reinforcement included in the combined layer.

I claim:

1. A method of forming a structural board panel including providing a loose mat of overlapping strands of cellulistic material to which a resin adhesive has been applied, compressing and curing said mat to give an open structural block, applying a portland cement mix to penetrate into interstices between said strands, providing a rendering layer on said block, and introducing into a portion of said portland cement mix a reinforcement of resinated filamentary material which is applied as a layer spaced from said block of cellulistic material.

2. A method of forming a structural board panel as claimed in claim 1, wherein a facing layer of said portland cement mix is applied over said rendering layer.

3. A method of forming a structural board panel as claimed in claim 2, wherein resin is applied to said filamentary material and cured partially to an extent sufficient to achieve an adhesive bond prior to introduction into said portland cement mix.

4. A method of forming a structural board panel as claimed in claim 3, wherein said resinated filamentary material is introduced into said portland cement mix at a stage in the curing process at which said exothermic reactions in said resin and the portland cement mix mutually assist.

5. A method of forming a structural board panel as claimed in claim 4, wherein said filamentary material is in the form of nylon strands.

6. A method of forming a structural board panel as claimed in claim 5 wherein said nylon strands are introduced as an open mesh net into said portland cement mix.

7. A method of forming a structural board panel as claimed in claim 6, wherein said nylon strands are coated with a water soluble, phenol free, resorcinol formaldehyde novalac resin cross-linked with formaldehyde or paraform.

8. A method of forming a structural board panel as claimed in claim 7, wherein said nylon strands are introduced as an open mesh net into said portland cement mix.

9. A method of forming a structural board panel including providing a loose mat of overlapping strands of cellulistic material to which a resin adhesive has been applied, compressing and curing said mat to give an open structured block having a density of between 160 and 400 kg/m$^3$ and surface aperture of between 25% and 75%, applying a portland cement mix to one face of said block to penetrate interstices between said strands to a depth of between 5 and 25 mm, applying a portland cement mix rendering layer onto said face to a thickness of between 3 and 15 mm, laying an open mesh net of nylon strands coated with a water soluble, phenol free, resorcinol formaldehyde novalac resin cross-linked with formaldehyde or paraform and partially cured onto said rendering layer and then applying a portland cement mix facing layer over said open mesh net of nylon strands to a thickness of between 3 and 15 mm.

10. A structural board panel formed by a method which includes providing a loose mat of overlapping strands of cellulistic material to which a resin adhesive has been applied, compressing and curing said mat to give an open structured block, applying a portland cement mix to penetrate into interstices between said strands and to provide a rendering layer on said block wherein a reinforcement of resinated filamentary material is introduced into a portion of said portland cement mix and applied as a layer spaced from said block of cellulistic material.

11. A structural board panel as claimed in claim 10, wherein a facing layer of said portland cement mix is applied over said rendering layer.

12. A structural board panel as claimed in claim 11, wherein resin is applied to said filamentary material and cured partially to an extent sufficient to achieve an adhesive bond prior to introduction into said portland cement mix.

13. A structural board panel as claimed in claim 17, wherein said resinated filamentary material is introduced into said portland cement mix at a stage in the curing process at which the exothermic reactions in said resin and said portland cement mix mutually assist.

14. A structural board panel as claimed in claim 13, wherein said filamentary material is in the form of nylon strands.

15. A structural board panel as claimed in claim 14, wherein said nylon strands are introduced as an open mesh net into said portland cement mix.

16. A structural board panel as claimed in claim 15, wherein said nylon strands are coated with a water soluble, phenol free, resorcinol formaldehyde novalac resin cross-linked with formaldehyde or paraform.

17. A structural board panel as claimed in claim 16, wherein said nylon strands are introduced as an open mesh net into said portland cement mix.

18. A structural board panel formed by a method including depositing a loose mat of overlapping strands of cellulistic material to which a resin adhesive has been applied, compressing and curing said mat to give an open structured block having a density of between 160 and 400 kg/m$^3$ and surface aperture of between 25% and 75%, applying a portland cement mix to one face of said block to penetrate interstices between the strands to a depth of between 5 and 25 mm, applying a portland cement mix rendering layer onto said face to a thickness of between 3 and 15 mm, laying an open mesh net of nylon strands coated with a water soluble, phenol free, resorcinol formaldehyde novalac resin cross-linked with formaldehyde or paraform and partially cured onto the rendering layer and then applying a portland cement mix facing layer over said open mesh net of nylon strands to a thickness of between 3 and 15 mm.

* * * * *